(12) United States Patent
Yamamoto et al.

(10) Patent No.: US 7,626,494 B2
(45) Date of Patent: Dec. 1, 2009

(54) MOVING BODY, AND ELECTRONIC KEY SYSTEM FOR MOVING BODY

(75) Inventors: Takao Yamamoto, Wako (JP); Tomohiko Yashiro, Wako (JP); Masaki Yamazaki, Wako (JP); Takeshi Konno, Wako (JP); Sho Yamamoto, Wako (JP); Yusuke Funayose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 565 days.

(21) Appl. No.: 11/354,504

(22) Filed: Feb. 15, 2006

(65) Prior Publication Data
US 2006/0181409 A1    Aug. 17, 2006

(30) Foreign Application Priority Data
Feb. 17, 2005 (JP) ............................. 2005-040583

(51) Int. Cl.
*B60Q 1/00* (2006.01)
*B60T 8/32* (2006.01)
*G06F 19/00* (2006.01)
*G06G 7/70* (2006.01)

(52) U.S. Cl. ..................... 340/441; 701/36; 701/93; 701/99

(58) Field of Classification Search .................. 340/5.6, 340/532, 5.2, 5.1, 5.8, 5.7; 701/93–115, 701/56, 55, 2
See application file for complete search history.

(56) References Cited

U.S. PATENT DOCUMENTS

| | | | | |
|---|---|---|---|---|
| 4,754,255 A | * | 6/1988 | Sanders et al. ............. 307/10.4 |
| 4,890,108 A | * | 12/1989 | Drori et al. .................. 341/176 |
| 5,410,476 A | * | 4/1995 | Iizuka .......................... 701/56 |
| 5,661,455 A | * | 8/1997 | Van Lente et al. ........... 340/525 |
| 5,769,051 A | * | 6/1998 | Bayron et al. ................ 123/335 |
| 6,029,107 A | * | 2/2000 | Sato ............................ 701/58 |
| 6,070,118 A | * | 5/2000 | Ohta et al. .................... 701/65 |
| 6,127,922 A | * | 10/2000 | Roddy et al. ........... 340/426.14 |
| 6,414,586 B1 | * | 7/2002 | Yoshizawa .................. 340/5.2 |
| 6,952,156 B2 | * | 10/2005 | Arshad et al. ................ 340/5.6 |
| 7,148,790 B2 | * | 12/2006 | Aoyama et al. .......... 340/425.5 |

FOREIGN PATENT DOCUMENTS

JP    2004-114860    4/2004

* cited by examiner

*Primary Examiner*—Benjamin C Lee
*Assistant Examiner*—Michael Shannon
(74) *Attorney, Agent, or Firm*—Hamre, Schumann, Mueller & Larson, P.C.

(57) ABSTRACT

An electronic key system 100 for a moving body, for example an all-terrain vehicle 10, includes an electronic key 11 and a control unit 50. The electronic key 11 transmits a control code Md stored in a ROM 76. The control unit 50 reads a speed limit Vs and a power limit Ws out of one of first to fourth control mode data Md1 to Md4, which corresponds to the received control code Md, and supplies the limits to a drive control performing section 104. The drive control performing section 104 controls an engine 22 in accordance with the speed limit Vs and the power limit Ws to limit a travel speed V and power W. This renders the driving performance appropriate to the driving condition and/or the driver.

6 Claims, 9 Drawing Sheets

MOVING BODY, AND ELECTRONIC KEY SYSTEM FOR MOVING BODY

FIELD

The present invention relates to a moving body and an electronic key system for a moving body, which carry out wireless communication between a transmitter (i.e. the electronic key) which a driver carries and a control unit mounted on the moving body, wherein the transmission/reception of a predetermined code is performed.

BACKGROUND

In recent times, so-called electronic keys, each of which includes an IC and transmission/reception means, have been put to practical use as a key of a vehicle, instead of the conventional mechanical keys. The electronic key receives a request signal transmitted from a control unit of a vehicle when the electric power switch of the vehicle is turned on, and returns an authentication code to the vehicle in response to request signal. The control unit of the vehicle checks the received authentication code, and when the request is from an authorized user, starts an engine. For example see Japanese Patent Laid-Open Publication No. 2004-114860. With an electronic key system, a driver has only to carry the electronic key when getting in or on a moving body, which is preferable because the trouble of taking out or searching for the electronic key is eliminated.

A moving body is sometimes driven by different occupants, and is sometimes driven in different conditions. For example, an all-terrain vehicle may run at a low speed when the vehicle is used for farm work or the like, while the vehicle sometimes runs at a high speed when the vehicle is used for competition. Conventional all-terrain vehicles do not have means for discriminating the driving conditions in controlling the driving mechanism. Accordingly, when the all-terrain vehicle that is usually used for farm work is used for competition, it is necessary to perform tuning of the engine and the like every time, and, after the competition, to restore the tuning of the all-terrain vehicle.

In addition, in the case where the moving body is shared among a number of different individuals, for example a family, the driving skills and the driving conditions can vary depending on the occupants. However, since conventional moving bodies do not discriminate the occupants, and always exhibit the same driving performance, occupants having little experience may tend to shy away from driving a so-called high-power moving body.

SUMMARY

A moving body and an electronic key system for a moving body, with which appropriate driving performance can be obtained depending on driving conditions and/or drivers.

A moving body according to the present invention is a moving body in which a control unit controls a driving mechanism, wherein the control unit receives a first identification signal transmitted from a portable transmitter, and controls the driving mechanism in accordance with the first identification signal.

By controlling the driving mechanism in accordance with the first identification signal in this way, the moving body can exhibit different driving performance depending on the portable transmitter which an occupant carries, so that the appropriate driving performance can be obtained depending on driving conditions and/or drivers. The driving mechanism widely means the mechanism used for traveling, and includes a drive source, a power transmission mechanism, and a shock absorbing mechanism, as well as a water jet propulsion mechanism of a personal watercraft or the like.

It is preferable that the portable transmitter transmit a second identification signal for authentication, and the control unit enable the moving body to be activated when a stored authentication code and the received second identification signal coincide. With this, it is made possible to use the electronic key, which is used for permitting the vehicle to be driven and for authentication, also as the portable transmitter. In addition, by separating the first identification signal for differentiating the power control, and the second identification signal for indicating the activation permission, it is possible to standardize the power control section of the control unit, which section responds to the first identification signal.

If the control unit allows a predetermined meter to display a control signal based on the received first identification signal, an occupant can check the current driving performance.

The control unit may set a travel speed limiting value to a different value in accordance with the first identification signal to control the driving mechanism. With this, it is made possible to drive the moving body at a speed not exceeding a speed appropriate to the occupant or the driving condition.

The control unit may set gear change characteristics of a transmission in the driving mechanism to different characteristics in accordance with the first identification signal. With this, the gear change pattern appropriate to the occupant or the driving condition is realized.

The control unit may set rotational frequency of a drive source, power thereof, or a limiting value of torque thereof, in the driving mechanism to a different value in accordance with the first identification signal. With this, the driving performance appropriate to the occupant or the driving condition is realized.

In one embodiment, an electronic key system for a moving body includes a portable transmitter transmitting a first identification signal; and a control unit mounted on a moving body and receiving the first identification signal, wherein the control unit controls a driving mechanism of the moving body in accordance with the received first identification signal.

By controlling the driving mechanism in accordance with the first identification signal in this way, the moving body can exhibit different driving performance depending on the portable transmitter which an occupant carries, so that the appropriate driving performance can be obtained depending on driving conditions and/or drivers.

It is preferable that the portable transmitter include switching means for changing the first identification signal to be transmitted. With this, even if one portable transmitter is used, by operating the switching means, multiple driving performances can be obtained.

With the moving body and the electronic key system for a moving body according to the present invention, by controlling the driving mechanism in accordance with the first identification signal transmitted from the portable transmitter which an occupant carries, the moving body can exhibit different driving performance depending on the portable transmitter, so that the appropriate driving performance can be obtained depending on driving conditions and/or drivers.

If the portable transmitter transmits a second identification signal for authentication, and the control unit enables the moving body to be activated when a stored authentication code and the received second identification signal coincide, it is possible to use the so-called electronic key also as the portable transmitter. In addition, by separating the first identification signal for differentiating the power control, and the second identification signal for indicating the activation permission, it is possible to standardize the power control section of the control unit, which section responds to the first identification signal.

DETAILED DESCRIPTION

A moving body and an electronic key system for a moving body will be described in reference to embodiments illustrated in the accompanying FIGS. 1 to 10.

An all-terrain vehicle 10 according to one embodiment is a moving body in which the start of an engine (a drive source) 22 or the like is permitted when a radio wave signal transmitted from an electronic key (a portable transmitter) 11 (see FIG. 3), which an occupant carries, is a signal sent by an authorized user. An electronic key system 100 for a moving body according to this embodiment is a system to be applied to the all-terrain vehicle 10 (see FIG. 5), and includes the electronic key 11 and a control unit 50.

Figure 1:
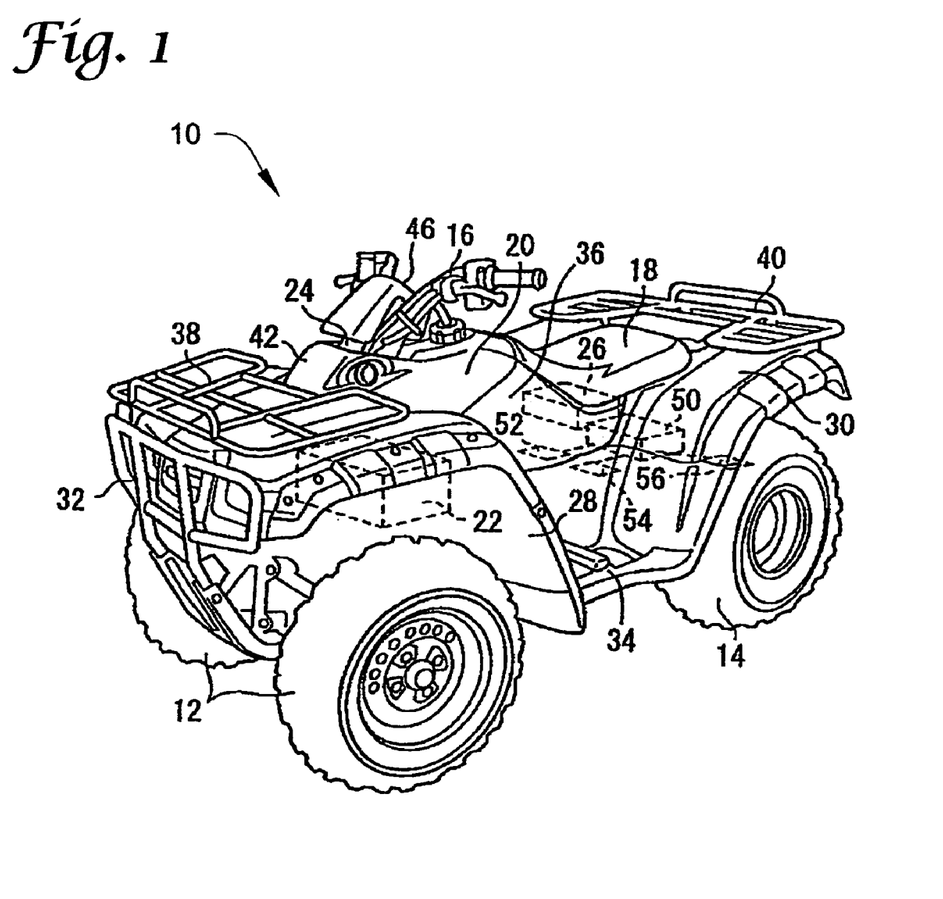
FIG. 1 is a perspective view of an all-terrain vehicle according to an embodiment.

The all-terrain vehicle 10 includes: two front wheels 12 for steering; two rear wheels 14 for driving; a handlebar 16 for steering the front wheels; and a seat 18 for a driver to get on in an astride manner. In front of the seat 18, a fuel tank 20 is disposed. Under the fuel tank 20, the engine 22 is mounted. The driving force provided by the engine 22 is transmitted to the rear wheels 14 via a power transmission mechanism (not shown) and a transmission 116 (see FIG. 5). The handlebar 16 is pivotally supported by a head tube 24 and is therefore pivotable. Through the turning operation of the handlebar 16 by the driver, the front wheels 12 are steered via a steering mechanism not shown. Under the seat 18, a battery 26 which is used as a power source for, for example, starting the engine 22 is provided.

In order to prevent a slip at the time of running on rough roads, such as a sandy place, the all-terrain vehicle 10 has tires, which have a wide width and a bumpy shape, installed as the front and rear wheels 12 and 14, and the treads of the front wheels 12 and the rear wheels 14 are set sufficiently wider than the width of the seat 18, so that stable running is provided. In addition, the all-terrain vehicle 10 is provided with a left-right pair of front mud guards 28 covering the upper side and the rear of the front wheels 12, and a left-right pair of rear mud guards 30 covering the front and the upper side of the rear wheels 14, as well as a front guard pipe 32 for protecting the front face. Between the rear lower end portions of the front mud guards 28 and the front lower end portions of the rear mud guards 30, footboards 34 on which the occupant put his/her feet are provided. Between the seat 18 and the footboards 34, a side cover 36 covering the engine 22 and other components is provided. Above the front wheels 12, a front carrier 38 is provided which is laid across laterally over an upper surface of the left-right pair of front mud guards 28. Similarly, above the rear wheels 14, a rear carrier 40 is provided so as to be laid across laterally over an upper surface of the left-right pair of rear mud guards 30.

Around the head tube 24, a head tube cover 42 covering a brake wire, an accelerator wire and other components is provided. On the left side of the head tube cover 42, an accessory socket is connected to the battery 26. In addition, a monitor (a meter) 46 is provided at a high-visibility location above the head tube.

In addition, the all-terrain vehicle 10 includes: the control unit 50 which performs the power control of the engine 22, the electric power source control and the like; a receiver 52 which receives a radio wave signal transmitted from the electronic key 11 and supplies the signal to the control unit 50; and a transmitter 54 which transmits a predetermined confirmation radio wave signal from the control unit 50 to the electronic key 11. The control unit 50 is connected to a speed sensor 56, and is capable of sensing a travel speed V.

Figure 2:
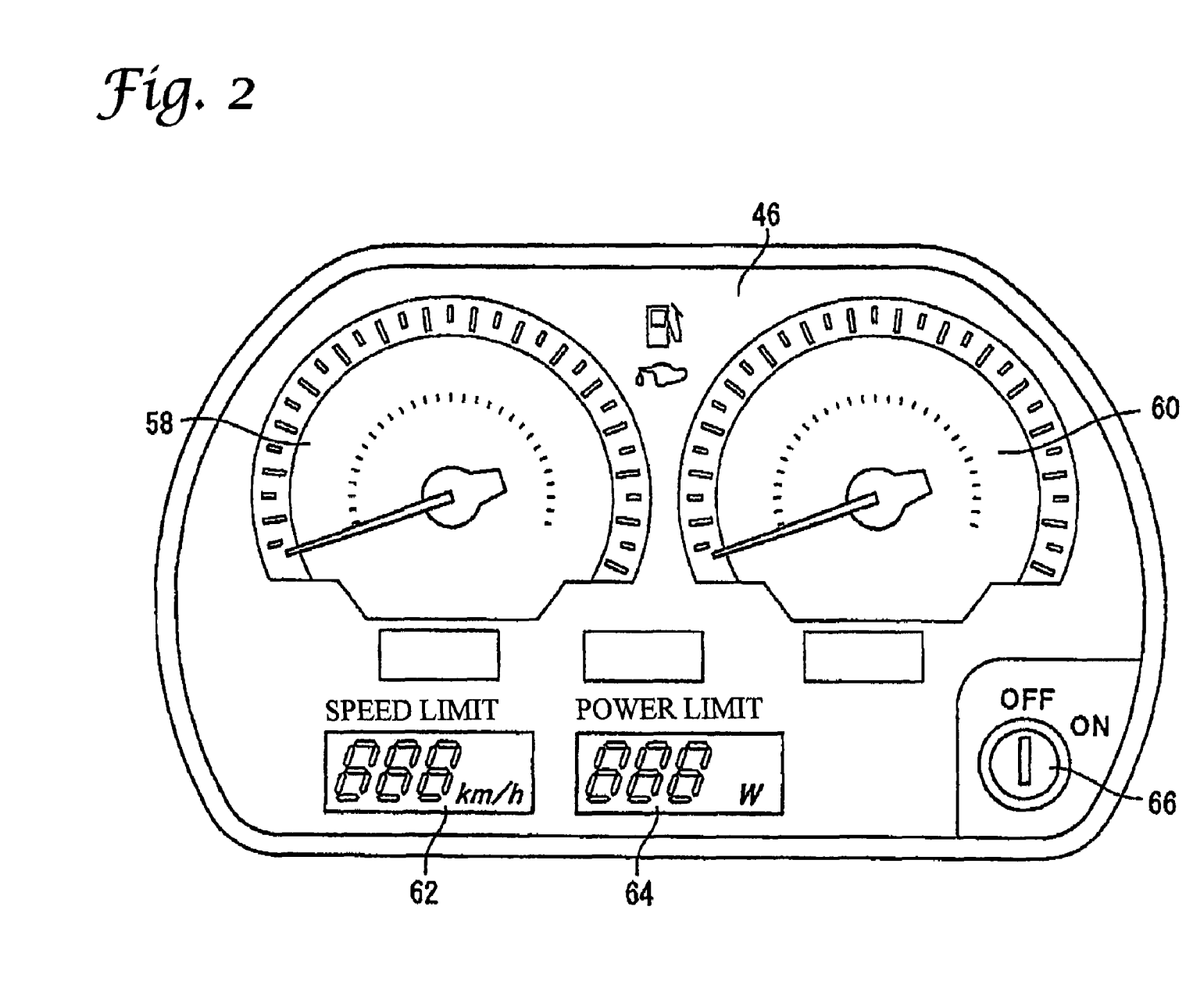
FIG. 2 is a plan view of a monitor of the all-terrain vehicle.

As shown in FIG. 2, the monitor 46 includes: a speed meter 58; a tachometer 60; a speed limit meter 62 and a power limit meter 64 displaying a preset speed limit Vs and power limit Ws via a liquid crystal display; and a power switch 66. The power switch 66 is a rotary switch which is rotated directly by hand, rather than a switch of the so-called key-cylinder type. The speed limit Vs and the power limit Ws indicated by the speed limit meter 62 and the power limit meter 64 will be described later.

Figure 3:
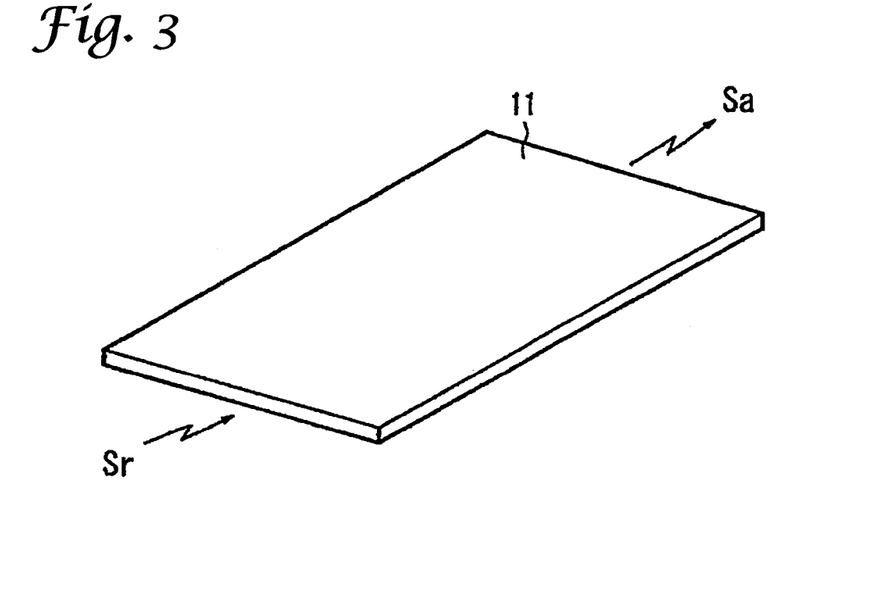
FIG. 3 is a perspective view of an electronic key.

As shown in FIG. 3, the electronic key 11 has a shape of a portable small card, and an IC chip is embedded therein-.

Figure 4:
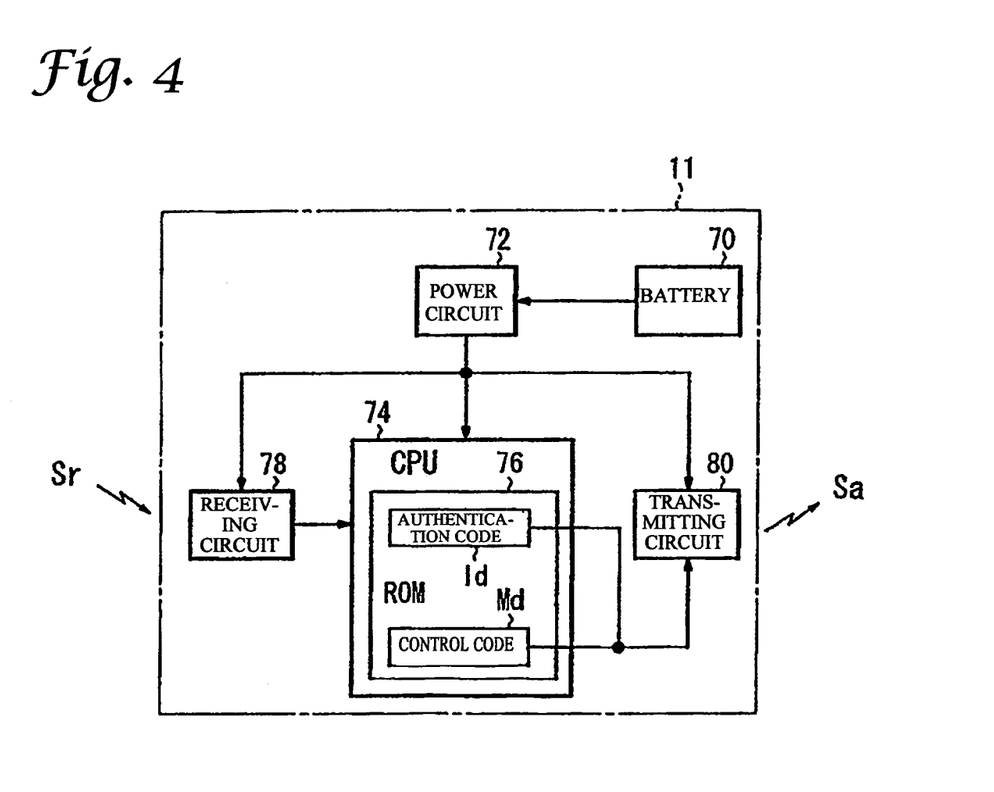
FIG. 4 is a block diagram of the electronic key.

As shown in FIG. 4, the electronic key 11 includes a battery 70, a power circuit 72, a CPU 74, a ROM 76, a receiving circuit 78 and a transmitting circuit 80. The power circuit 72 is the circuit supplying electric power from the battery 70 to the receiving circuit 78, the transmitting circuit 80 and the CPU 74. The receiving circuit 78 has a receiving antenna not shown, receives, for example, a confirmation signal Sr transmitted from the control unit 50 via the receiving antenna, extracts the signal from the carrier wave, and demodulates the signal.

When receiving the confirmation signal Sr, the CPU 74 reads an authentication code (a second identification signal) Id and a control code (a first identification signal) Md stored in the ROM 76, and outputs the codes as a transmission data Dt to the transmitting circuit 80. The transmitting circuit 80 has a transmitting antenna not shown, modulates the carrier wave on the basis of the transmission data Dt supplied from the CPU 74, and transmits the data as an answer signal Sa via the transmitting antenna. The authentication code Id is a unique code set for each all-terrain vehicle 10. The control code Md is data specifying the control mode of the all-terrain vehicle 10, and is a code associated with, for example, four types of control modes.

The receiver 52 having received the answer signal Sa demodulates the answer signal, extracts the authentication code Id and the control code Md, and supplies the codes to the control unit 50. The authentication code Id and the control code Md do not have to be strictly separated. For example, the higher order digits out of the code represented by multiple digits may be the authentication code Id, and the lower order digits thereof may be the control code Md.

Figure 5:
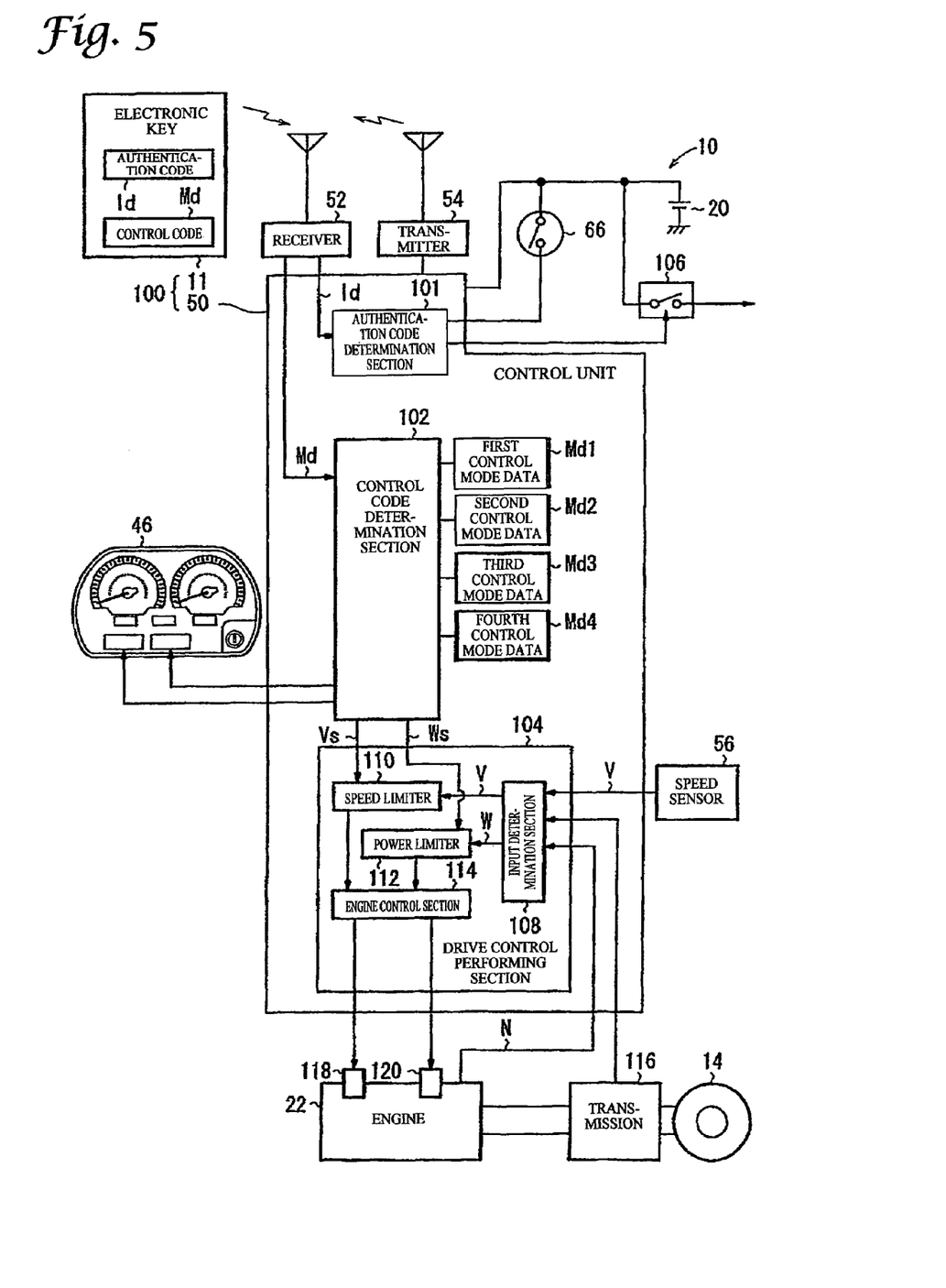
FIG. 5 is a block diagram of a control unit and peripherals thereof in the all-terrain vehicle.

As shown in FIG. 5, the electronic key system 100 for a moving body includes the electronic key 11 and the control unit 50. The control unit 50 includes an authentication code determination section 101, a control code determination section 102, and a drive control performing section 104.

The authentication code determination section 101 detects an "on" signal when the occupant turns on the power switch 66, and then transmits the confirmation signal Sr to the electronic key 11 via the transmitter 54. Moreover, the authentication code determination section 101 compares the authentication code Id supplied from the receiver 52 with the stored data set as the unique data for each all-terrain vehicle 10. If the authentication code Id coincides with one of the codes in the stored data set, the main relay 106, one terminal of which is connected to the battery 26, is turned on, and predetermined electric and electronic devices are supplied with electric power from the other terminal. If the comparison does not show coincidence, the main relay 106 is not operated, and the electric and electronic devices are not supplied with electric power. Accordingly, the all-terrain vehicle 10 does not start and the theft thereof can be prevented.

The control code determination section 102 refers to the control code Md supplied from the receiver 52, checks which control mode the data represents out of the four control modes, and reads the corresponding data among a first control mode data Md1, a second control mode data Md2, a third control mode data Md3, and a fourth control mode data Md4 from a predetermined storage section. Each of the first to fourth control mode data Md1 to Md4 holds a speed limit Vs and a power limit Ws. With regard to the speed limit Vs and the power limit Ws, the values thereof stored in the first control mode data Md1 are the largest, and the values are set in a decreasing manner in the order of the second control mode data Md2, the third control mode data Md3, and the fourth control mode data Md4. The speed limit Vs and the power limit Ws stored in the first control mode data Md1 may be set to such large values that the drive force is not limited practically.

The control code determination section 102 supplies, to the drive control performing section 104 and the monitor 46, the speed limit Vs and the power limit Ws which have been read in accordance with the control code Md. The monitor 46 displays the speed limit Vs and the power limit Ws on the speed limit meter 62 and the power limit meter 64 described above.

The drive control performing section 104 includes an input determination section 108, a speed limiter 110, a power limiter 112 and an engine control section 114. The input determination section 108 receives and processes the travel speed V from the speed sensor 56, and supplies the travel speed V to the speed limiter 110. Moreover, the input determination section 108 receives an engine speed N from the engine 22, receives a signal indicating the gear from the transmission 116, processes the signals derives the current power W of the engine 22 from these signals, and supplies the power W to the power limiter 112. Note that the term power W used herein means the power where the unit thereof is W.

The speed limiter 110 holds the speed limit Vs supplied from the control code determination section 102, and compares the travel speed V supplied from the input determination section 108 with the speed limit Vs. If it is judged that the travel speed V is higher than the speed limit Vs, a predetermined speed limiting signal is supplied to the engine control section 114.

The power limiter 112 holds the power limit Ws supplied from the control code determination section 102, and compares the power W supplied from the input determination section 108 with the power limit Ws. If it is judged that the power W is higher than the power limit Ws, a predetermined power limiting signal is supplied to the engine control section 114.

The engine control section 114 controls the fuel injection of an injector 118 of the engine 22 in accordance with the operation of the accelerator not shown, and the like, and controls the ignition of an ignition plug 120. In addition, when at least one of the speed limiting signal and the power limiting signal is supplied from the speed limiter 110 and the power limiter 112, the engine control section 114 stops the fuel injection from the injector 118 or reduces the injection amount thereof, or stops the ignition of the ignition plug 120, reduces the ignition frequency thereof, or adjusts the ignition timing thereof. Thus, the all-terrain vehicle 10 is prevented from running at a speed higher than the speed limit Vs, and is controlled so as not to generate power exceeding the power limit Ws. It should be noted that, in the comparison and determination process in the speed limiter 110 and the power limiter 112, an appropriate hysteresys operation may be performed, and multiple threshold values may be provided to perform the speed and power limiting processing in a graded manner.

The control unit 50 includes a CPU (Central Processing Unit) as a main control section, a RAM (Random Access Memory) and a ROM (Read Only Memory) as storage sections, drivers, and others, and the above functional sections are realized in such a way that the CPU reads programs, and executes software processes while cooperating with the storage section and others.

With the all-terrain vehicle 10 and the electronic key system 100 for a moving body configured in this way, it is possible to change the driving performance on the basis of the electronic key 11, as described below.

Figure 6:
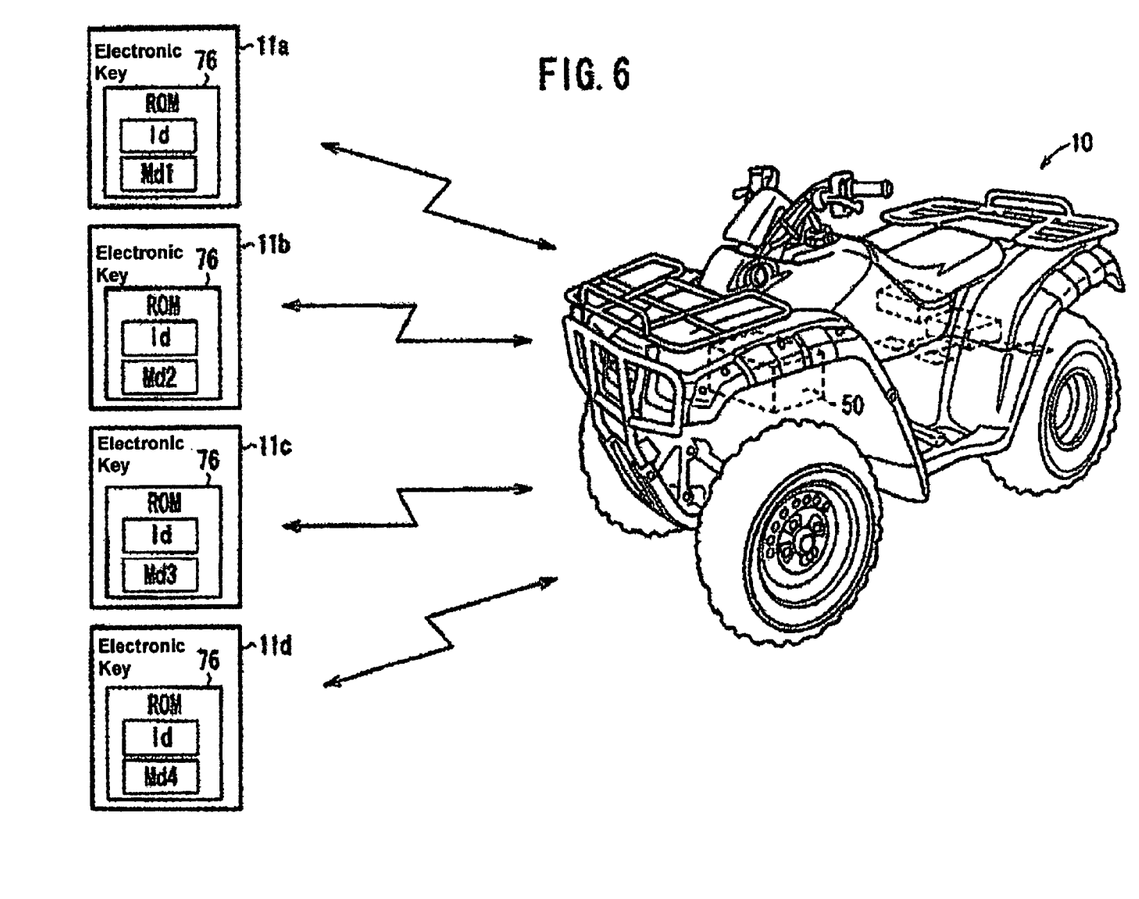
FIG. 6 is a schematic diagram showing a relation between the all-terrain vehicle and a plurality of electronic keys associated therewith.

Specifically, as shown in FIG. 6, when four electronic keys 11a, 11b, 11c and 11d are provided in each of which the authentication code Id corresponding to the all-terrain vehicle 10 is stored in the ROM 76, the electronic keys 11a to 11d are set to hold the first to fourth control mode data Md1 to Md4, respectively.

In this case, the use of any of the electronic keys 11a to 11d causes the comparison between the authentication code Id and the stored data in the control unit 50 to show coincidence, so that the start of the all-terrain vehicle 10 is permitted. Accordingly, if a family of four has the electronic keys 11a to 11d individually, for example, they can share the all-terrain vehicle 10.

Figure 7:
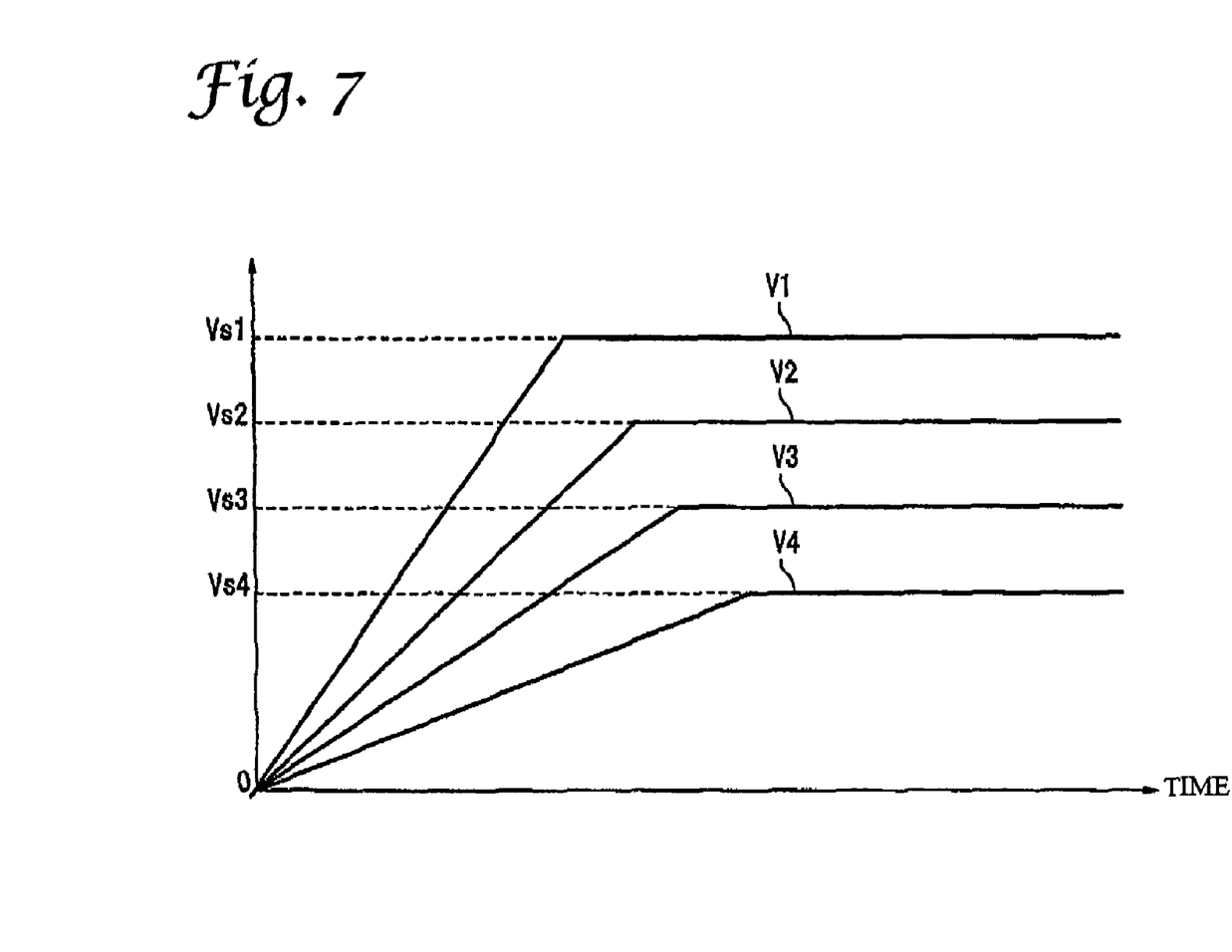
FIG. 7 is a graph showing speed transitions set depending on the electronic keys.

In addition, since the electronic keys 11a to 11d hold the different first to fourth control mode data Md1 to Md4, the all-terrain vehicle 10 exhibits different driving performance, depending on which key has been used to start the vehicle out of the electronic keys 11a to 11d. Specifically, if the full throttle operation is performed from the stopped state after the vehicle is started by the use of the electronic key 11a, since the high power limit Ws stored in the first control mode data Md1 is selected, a speed transition V1 in this case shows the high acceleration as shown in FIG. 7. With regard to the speed transition V1, it is possible for the vehicle to accelerate to a high speed limit Vs1 by virtue of the high speed limit Vs stored in the first control mode data Md1.

On the other hand, if the vehicle has been started by the use of the other electronic keys 11b to 11d, as shown by corresponding speed transitions V2 to V4, the acceleration is set in a decreasing manner in this order, and the corresponding speed limits Vs2 to Vs4 become small in this order.

Accordingly, in a case where the all-terrain vehicle 10 is shared among a family of four, if the electronic keys 11a to 11d are carried individually, it is possible for the vehicle to exhibit the driving performance appropriate to their driving technique. In addition, it is preferable that, for example, one who uses the vehicle for farm work carry the electronic key 11d to prevent the power and speed from being excessively high, while one who uses the vehicle for competition carries the electronic key 11a to allow the vehicle to exhibit sufficiently high power and speed performance. In this case, the occupant has only to carry one of the electronic keys 11a to 11d, and tuning tools are not required. At the same time, needless to say, the time and labor required for tuning work are also not required.

It is preferable that, if the all-terrain vehicle 10 is a two-seater, and the two occupants carry the electronic keys 11a and 11b, the electronic key 11b with the low speed limit Vs and power limit Ws be given priority.

The occupant can check that the current setting is set on the basis of the electronic key 11 which he/she carries, on the speed limit meter 62 and the power limit meter 64 in the monitor 46.

Figure 8:
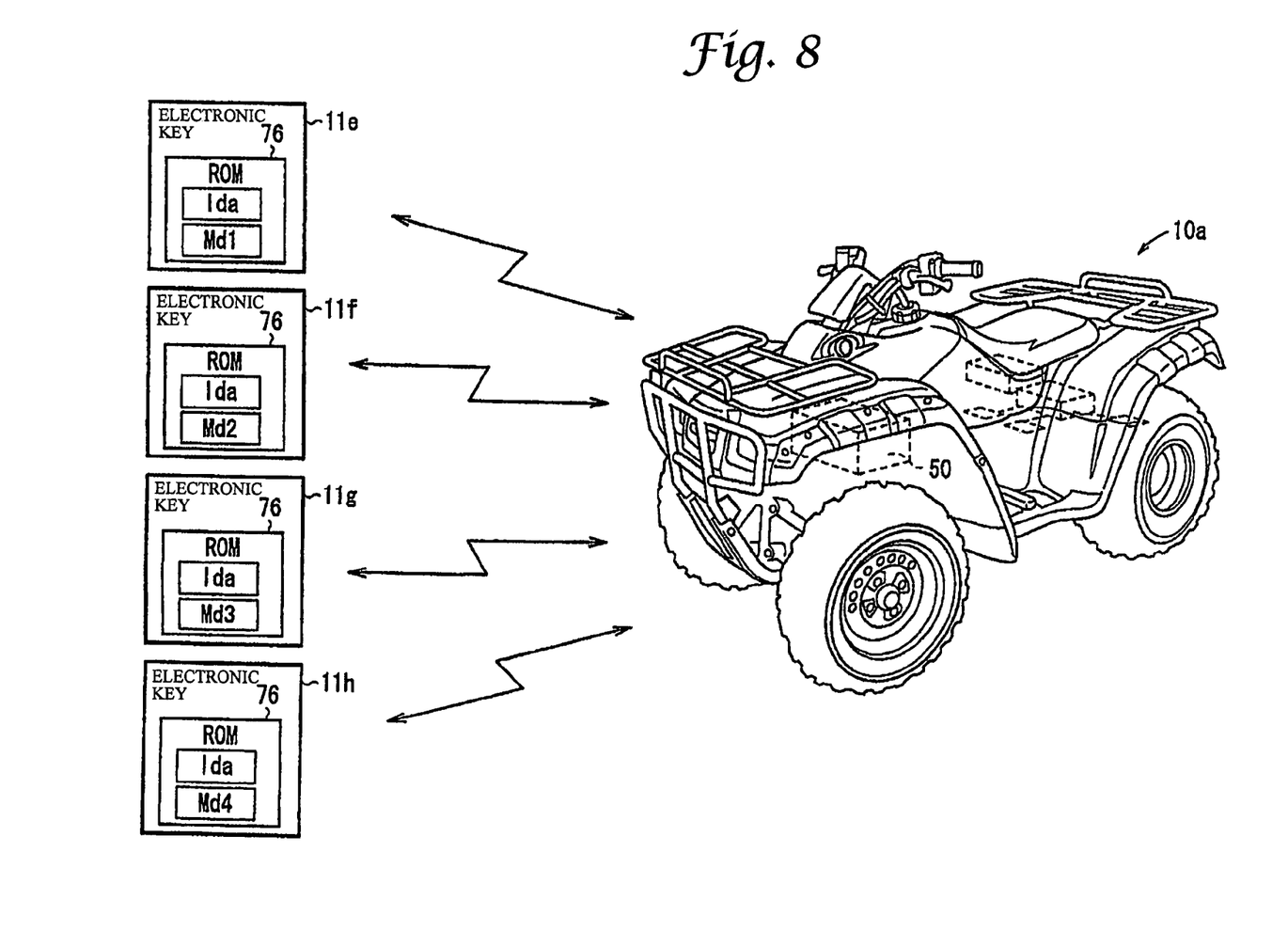
FIG. 8 is a schematic diagram showing a relation between another all-terrain vehicle and a plurality of electronic keys associated therewith.

As shown in FIG. 8, another all-terrain vehicle 10a possessed by another person is permitted to start by the use of the electronic keys 11e to 11h even if the vehicle is the same model as the all-terrain vehicle 10. In the all-terrain vehicle 10a, an authentication code determination section 101 is set so that the comparison shows coincidence for an authentication code Ida which is different from the above authentication code Id, and, in ROMs 76 of the electronic keys 11e to 11h, this authentication code Ida is stored. Accordingly, the all-terrain vehicle 10a cannot be started by the use of the above electronic keys 11a to 11d, and, on the other hand, the all-terrain vehicle 10 cannot be started by the use of the electronic keys 11e to 11h. Thus, only the owner can start his/her all-terrain vehicle 10 or 10a, and the theft thereof can therefore be prevented.

The electronic key 11e holds the control code in the ROM 76 as in the case of the electronic key 11a, and selects the first control mode data Md1 of the all-terrain vehicle 10a. Thus, at the time of full throttle opening, the all-terrain vehicle 10a runs in accordance with the speed transition V1 shown in FIG. 7. The electronic keys 11f to 11h hold the second to fourth control mode data Md2 to Md4 in the ROMs 76 as in the case of the electronic keys 11b to 11d, and can allow the all-terrain vehicle 10a to run in accordance with the corresponding speed transitions V2 to V4.

In the all-terrain vehicle 10 and the all-terrain vehicle 10a, only their storage data stored in the authentication code determination sections 101 for comparison (see FIG. 5) are different from each other, but the control code determination sections 102, the drive control performing sections 104, the first to fourth control mode data Md1 to Md4, the receivers 52, the transmitters 54 and others are the same, and it is therefore unnecessary to specially design these components for each vehicle. In the electronic keys 11a to 11h, only the authentication codes Id (or Ida) and the control codes Md stored in the ROMs 76 are different from each other, but the other parts have the same functions.

Figure 9:
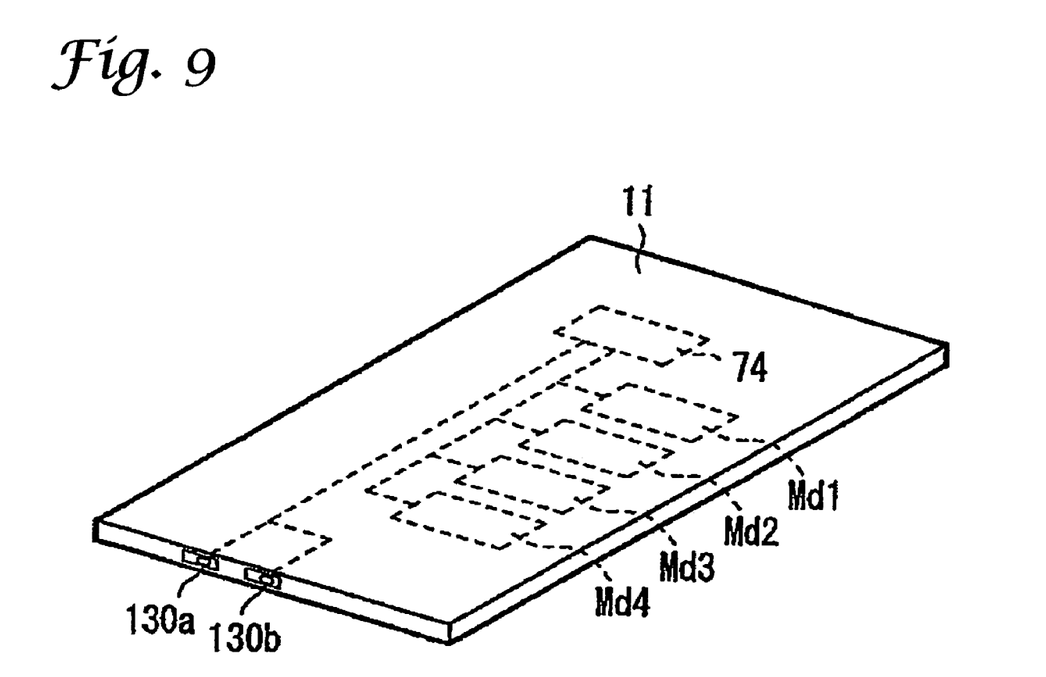
FIG. 9 is a perspective view of an electronic key according to a variation.
Figure 10:
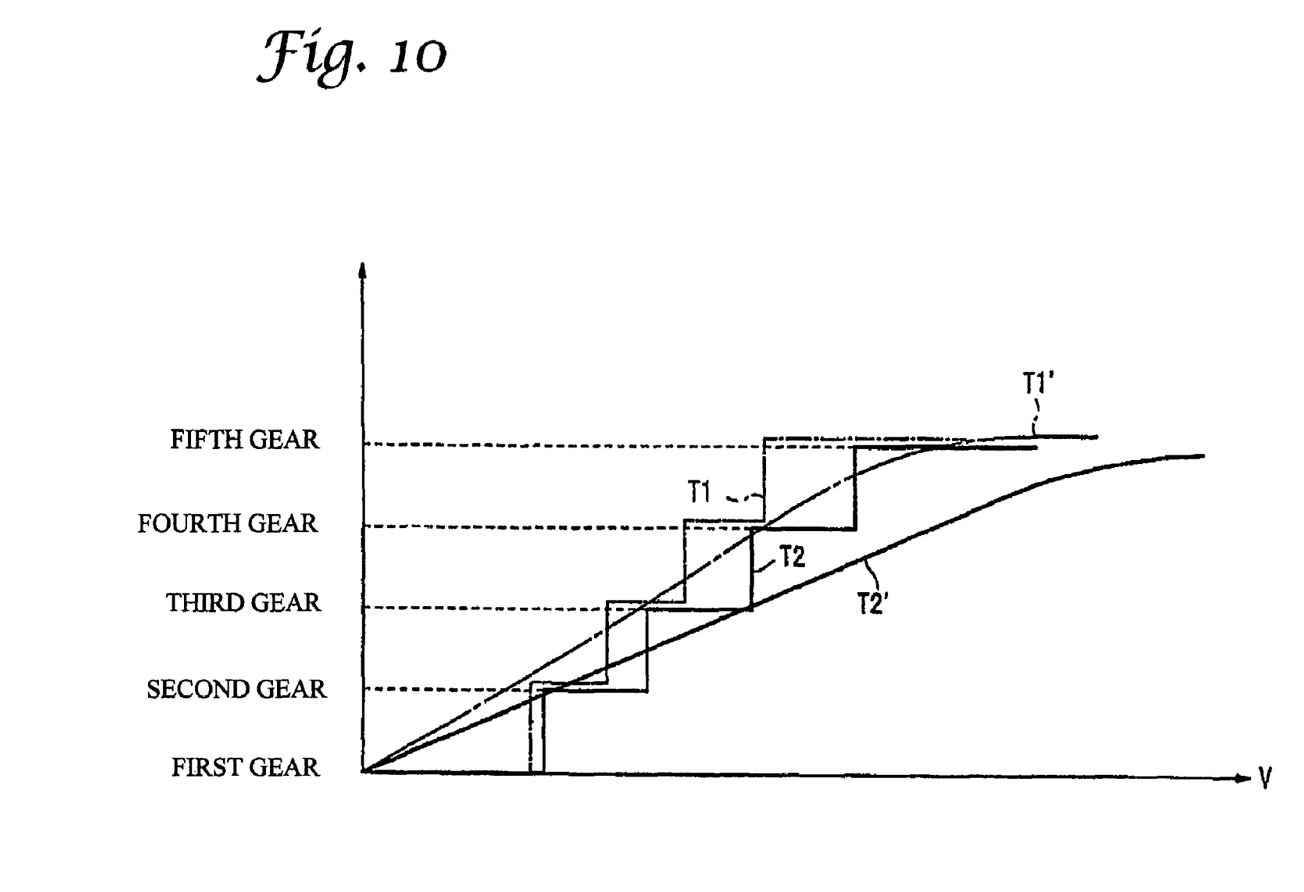
FIG. 10 is a diagram showing graphs of gear change timing set depending on the electronic keys.

Although it has been explained that, in the electronic key 11, one of the first to fourth control mode data Md1 to Md4 is stored in the ROM 76, the first to fourth control mode data Md1 to Md4 may be held, and one of the first to fourth control mode data Md1 to Md4 may be selected for transmission depending on the combination of the on/off states of two DIP switches (switching means) 130a and 130b, as shown in FIG. 9. By operating the DIP switches 130a and 130b, multiple driving performances can be obtained via one electronic key 11. The DIP switch 130a and the DIP switch 130b may be used for different purposes by using the DIP switch 130a for changing the speed limit Vs and using the DIP switch 130b for changing the power limit Ws. With regard to the first to fourth control mode data Md1 to Md4 stored in the electronic key 11, a recording type that allows the data to be rewritten via a certain magnetic recording device (switching means) may be employed.

The first to fourth control mode data Md1 to Md4 may hold, in addition to the speed limit Vs and the power limit Ws, other parameters or more specific parameters concerning the driving mechanism control of the engine 22. In addition, since the control code Md is composed of data with which it is possible to identify one of the four control modes, two bits of data will essentially suffice, and the transmission from the electronic key 11 to the receiver 52 can be easily and quickly performed. Even if the number of the control modes is 256, the modes can be discriminated by using 8-bit data, and the transmission of the control code Md can be easily and quickly performed.

In addition to (or alternatively to) the speed limit Vs and the power limit Ws, other parameters can be controlled, for example the gear change timing control of the transmission 116, the suppression control of the engine output torque and the engine speed N. The parameters controlled via the electronic key system are not limited to the power system of a moving body. The mechanism for adjusting the shock absorbing characteristics of the suspensions (the shock absorbing mechanisms) may be controlled, for example.

In the case where the transmission 116 is automatic, when the gear change timing is changed, it is preferable that the shifting speed of the gear corresponding to the travel speed V be changed depending on the control codes Md held in the electronic keys 11a to 11d. With this, when the electronic key 11a is used, as show in FIG. 10, a setting is employed such that the upshift is carried out at a relatively low speed in accordance with the corresponding gear change timing graph. But, when the electronic key 11b is used, a setting is employed such that the upshift is carried out at a relatively high speed in accordance with the corresponding gear change timing graph T2. In the case where the transmission 116 is a CVT (Continuously Variable Transmission) type, settings may be employed such that gear change timing graphs T1' and T2' are curves (or lines) having different slopes.

Changing the control of the driving mechanism by the use of the control code Md does not have to be performed in accordance with the parameters stored in the form of data as in the case of the first to fourth control mode data Md1 to Md4. For example, the control may be changed through a changing method using a map.

Although the description has been made using the all-terrain vehicle 10 as an example of a moving body, the electronic key system 100 for a moving body can be applied to other moving bodies, for example personal watercraft. When the electronic key system 100 for a moving body is applied to a personal watercraft, by using the electronic keys with different control codes for different purposes, it is possible to suppress the travel speed so that the travel speed does not exceed the speed limit corresponding to the water area. Accordingly, the variations in the speed and the power caused by the difference in the operations of occupants can be prevented.

In the racing of vehicles, a speed limit on the pit road applied at the time of the pit work during which refueling and/or certain maintenance are performed, is specified, and the speed limit can vary depending on the racing circuits. In this case, it is possible to appropriately limit the speed on the pit road by the use of the different electronic keys 11 depending on the racing circuits. After the vehicle has left the pit road, the speed limiting function may be released through a predetermined operation.

As described above, with the all-terrain vehicle 10 and the electronic key system 100 for a moving body, the control code Md stored in the ROM of the electronic key 11 is supplied to the control unit 50. In the control unit 50, the speed limit Vs and the power limit Ws are read out of one of the first to fourth control mode data Md1 to Md4, which corresponds to the control code Md, and are supplied to the drive control performing section 104 to limit the travel speed V and the power W. Accordingly, the all-terrain vehicle 10 can exhibit different driving performance depending on which key the occupant carries out of the electronic keys 11a to 11d, so that the appropriate driving performance can be obtained depending on driving conditions and/or drivers.

The electronic key system for a moving body and the moving body according to the present invention are not limited to the above embodiments, and various configurations may be employed without departing from the spirit of the present invention.

The invention claimed is:

1. A moving body, comprising:
   a monitor, including:
      a speed meter,
      a speed limit meter that displays travel speed limiting values, and
      a power limit meter that displays power limit values; and
   a control unit that controls a driving mechanism,
   wherein the control unit is configured to receive first identification signals transmitted from respective first and second portable transmitters,
   wherein at least one of the portable transmitters includes:
      a battery,
      a memory that stores a plurality of first identification codes,
      a transmitting circuit,
      a power circuit that supplies electric power from the battery to the transmitting circuit, and
      a switch configured to select a selected first identification code from the plurality of the first identification codes,
      wherein each of the plurality of first identification codes correspond to a predetermined value for a parameter of the control unit,
      wherein when one of the first identification codes is selected, the first identification signal transmitted from the portable transmitter corresponds to the selected first identification code,
   wherein when said first identification signals are received by the control unit, the control unit controls the driving mechanism in accordance with the first identification signal which is associated with a lower travel speed limiting value and a lower power limit value;
   wherein at least one of the portable transmitters transmits a second identification signal for authentication and the control unit is configured to receive the second identification signal,
   wherein the control unit includes a stored authentication code, and when the control unit receives the second identification signal the control unit enables the moving body to be activated when the stored authentication code and the received second identification signal coincide, and
   wherein the control unit allows the monitor to display the lower travel speed limiting value and the lower power limit value based on the received first identification signals.

2. The moving body according to claim 1,
   wherein the driving mechanism includes a transmission, and wherein the control unit sets gear change characteristics of the transmission in the driving mechanism to different characteristics in accordance with the first identification signal.

3. The moving body according to claim 1,
   wherein the driving mechanism includes a drive source, and wherein the control unit sets rotational frequency of the drive source, power thereof, or a limiting value of torque thereof, to a different value in accordance with the first identification signal.

4. The moving body according to claim 1, wherein the driving mechanism includes a Continuously Variable Transmission (CVT),
   when the control unit receives the first identification signal the control unit controls the CVT so a gear change timing of the transmission is set to one of a plurality of predetermined slopes in accordance with the first identification signal.

5. An electronic key system for a moving body having a driving mechanism, comprising:
   a first portable transmitter configured to transmit a first identification signal;
   a second portable transmitter configured to transmit a first identification signal, wherein the first identification signal transmitted from the second portable transmitter is different from the first identification signal transmitted from the first portable transmitter;
   the first portable transmitter including:
      a memory that stores a plurality of predetermined first identification signals, and
      a DIP switch configured for changing the first identification signal to be transmitted from a plurality of predetermined first identification signals stored in the memory; and
   a control unit mounted on the moving body and configured to receive the first identification signals transmitted from the first and the second portable transmitters,
   wherein the control unit controls the driving mechanism of the moving body in accordance with the received first identification signals,
   wherein when said first identification signals are received by the control unit, the control unit controls the driving mechanism in accordance with the first identification signal that is associated with a lower speed limit value and a lower power limit value; and
   wherein the moving body includes a monitor, the monitor including a speed meter, a speed limit meter that displays the lower speed limiting value, and a power limit meter that displays the lower power limit value.

6. The electronic key system for a moving body according to claim 5,
   wherein the portable transmitter is configured to transmit a second identification signal for authentication,
   he control unit includes a stored authentication code and the control unit is configured to receive the second identification signal for authentication, and
   the control unit is configured to enable the moving body to be activated when the stored authentication code and the received second identification signal coincide.

* * * * *